United States Patent
Kim et al.

(10) Patent No.: US 8,345,041 B2
(45) Date of Patent: Jan. 1, 2013

(54) METHOD FOR DISPLAYING A THREE-DIMENSIONAL IMAGE AND THREE-DIMENSIONAL IMAGE DISPLAY DEVICE FOR PERFORMING THE METHOD

(75) Inventors: Joo-Young Kim, Suwon-si (KR); Cheol-Woo Park, Suwon-si (KR); Seung-Hoon Lee, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 777 days.

(21) Appl. No.: 12/493,467

(22) Filed: Jun. 29, 2009

(65) Prior Publication Data
US 2010/0007661 A1    Jan. 14, 2010

(30) Foreign Application Priority Data
Jul. 11, 2008    (KR) .................. 10-2008-0067530

(51) Int. Cl.
*G06T 15/00* (2011.01)
(52) U.S. Cl. ........ 345/419; 345/427; 345/428; 345/604; 345/611; 382/104; 382/154
(58) Field of Classification Search .................. 345/419, 345/427, 428, 600, 604, 606, 611, 619; 382/104, 382/154
See application file for complete search history.

(56) References Cited

U.S. PATENT DOCUMENTS

| | | | | |
|---|---|---|---|---|
| 7,113,635 | B2 * | 9/2006 | Robert et al. | 382/154 |
| 7,660,436 | B2 * | 2/2010 | Chang et al. | 382/104 |
| 8,072,470 | B2 * | 12/2011 | Marks | 345/632 |
| 2003/0179194 | A1 | 9/2003 | Robert | |

FOREIGN PATENT DOCUMENTS

| | | |
|---|---|---|
| JP | 06-309431 | 11/1994 |
| JP | 2004-179702 | 6/2004 |
| KR | 1020050058085 | 6/2005 |

* cited by examiner

*Primary Examiner* — Phu K Nguyen
(74) *Attorney, Agent, or Firm* — H.C. Park & Associates, PLC

(57) ABSTRACT

A three-dimensional image display device includes a three-dimensional image generator and a display panel. The three-dimensional image generator includes a memory part, a control part, and an output buffer part. The memory part has a lookup table storing pixel-shift data corresponding to a plurality of viewpoints and depths. The control part stores image data and depth data in an internal memory, and outputs shifted image data based on the pixel-shift data. The output buffer part outputs three-dimensional image data based on the shifted image data. The display panel displays the three-dimensional image data.

36 Claims, 14 Drawing Sheets

DEPTH MAP SCAN

IMAGE EDGE

DEPTH MAP

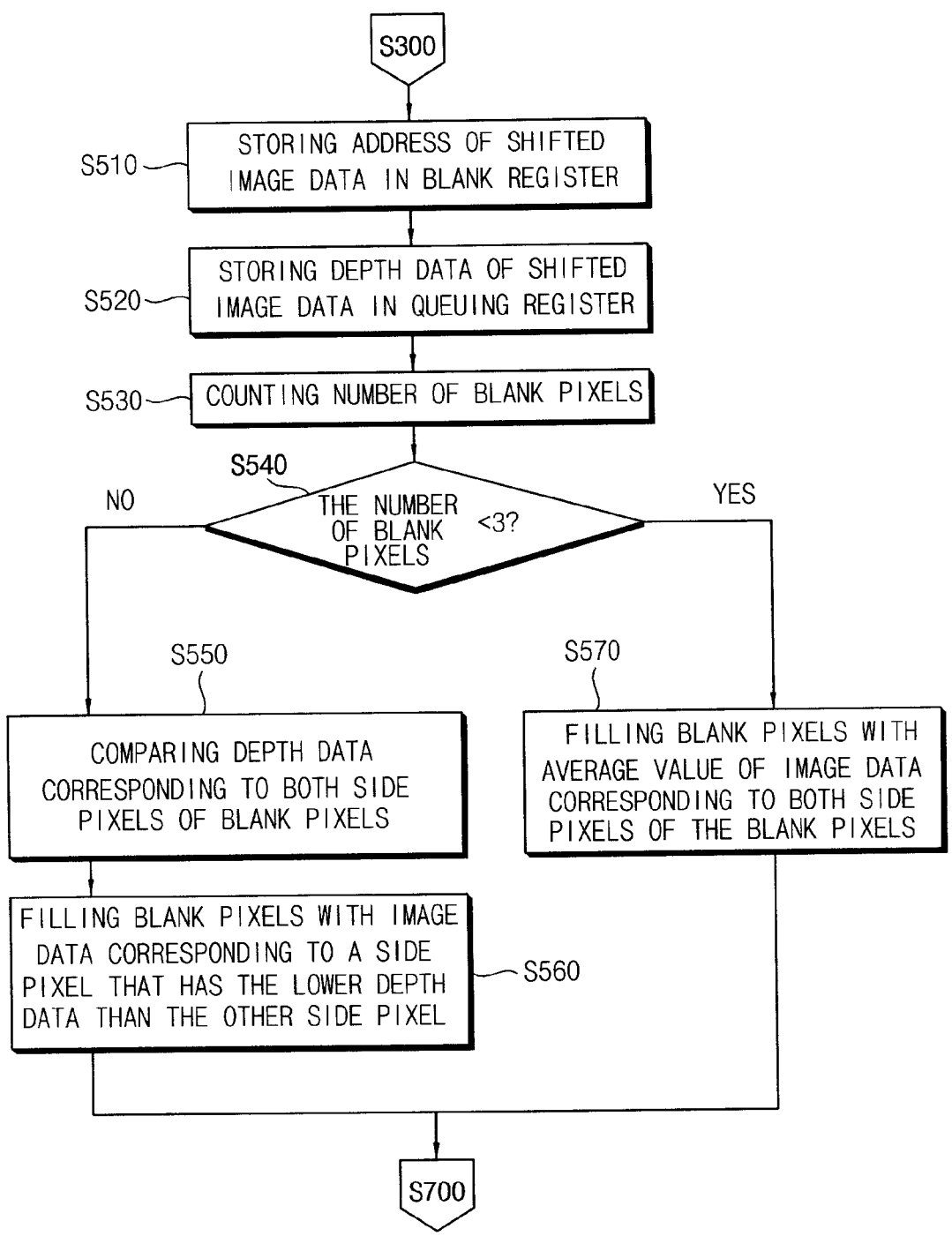

METHOD FOR DISPLAYING A THREE-DIMENSIONAL IMAGE AND THREE-DIMENSIONAL IMAGE DISPLAY DEVICE FOR PERFORMING THE METHOD

CROSS REFERENCE TO RELATED APPLICATION

This application claims priority from and the benefit of Korean Patent Application No. 2008-67530, filed on Jul. 11, 2008, which is hereby incorporated by reference for all purposes as if fully set forth herein.

BACKGROUND OF THE INVENTION

1. Field of the Invention

The present invention relates to a method for displaying a three-dimensional image and a three-dimensional image display device for performing the method. More particularly, the present invention relates to a method for displaying a three-dimensional image and a three-dimensional image display device in which two-dimensional image data and depth image data are received to display a three-dimensional image.

2. Discussion of the Background

Recently, a three-dimensional image (3D) may be required in various fields such as medical science, gaming, advertisements, education, military applications, etc.

Due to rapid advances in image technology, a 3D image technology applied to a high-definition television (HDTV) has been developed. Also, with advances in mobile communication technology, mobile 3D image display devices have been developed. For example, the mobile 3D image display devices include cell phones, personal digital assistants (PDAs), computers, notebook computers, portable televisions, etc.

Methods for displaying a 3D image include a lenticular lens type using a liquid crystal or lens, and an algorithm type receiving and processing image.

In the algorithm type method for displaying the 3D image, two-dimensional image data and depth data (depth image or 2.5D) used for the Moving Picture Expert Group (MPEG-2) standard are changed into 3D image data suitable for each display device. However, mapping pixels according to each image viewpoint and image depth in a cell phone or PDA requires many parts and components. Thus, the size and thickness of the display device may be increased.

Therefore, an integrated circuit (IC) capable of displaying a 3D image through an algorithm in a display device, according to inputting the image data and depth data, may be required.

SUMMARY OF THE INVENTION

The present invention provides a method for displaying a three-dimensional image, which may have enhanced display quality, by shifting two-dimensional image data.

The present invention also provides a display device for performing the above-mentioned method.

Additional features of the invention will be set forth in the description which follows, and in part will be apparent from the description, or may be learned by practice of the invention.

The present invention discloses a method for displaying a three-dimensional image. Image data and image depth data are stored. Pixel-shift data corresponding to the depth data and a plurality of viewpoints is read from a lookup table. Three-dimensional image data is outputted by shifting the image data based on the pixel-shift data. A three-dimensional image is displayed using the three-dimensional image data.

The present invention also discloses a three-dimensional image display device including a three-dimensional image generator and a display panel. The three-dimensional image generator includes a memory part, a control part, and an output buffer part. The memory part has a lookup table storing pixel-shift data corresponding to a plurality of image viewpoints and a plurality of image depths. The control part stores image data and depth data in an internal memory and outputs shifted image data based on the pixel-shift data. The output buffer part outputs three-dimensional image data based on the shifted image data. The display panel displays the three-dimensional image data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 12 is a flowchart showing a method for compensating blank pixels generated by shifting image data in accordance with an exemplary embodiment of the present invention.

DETAILED DESCRIPTION OF THE ILLUSTRATED EMBODIMENTS

Figure 1:
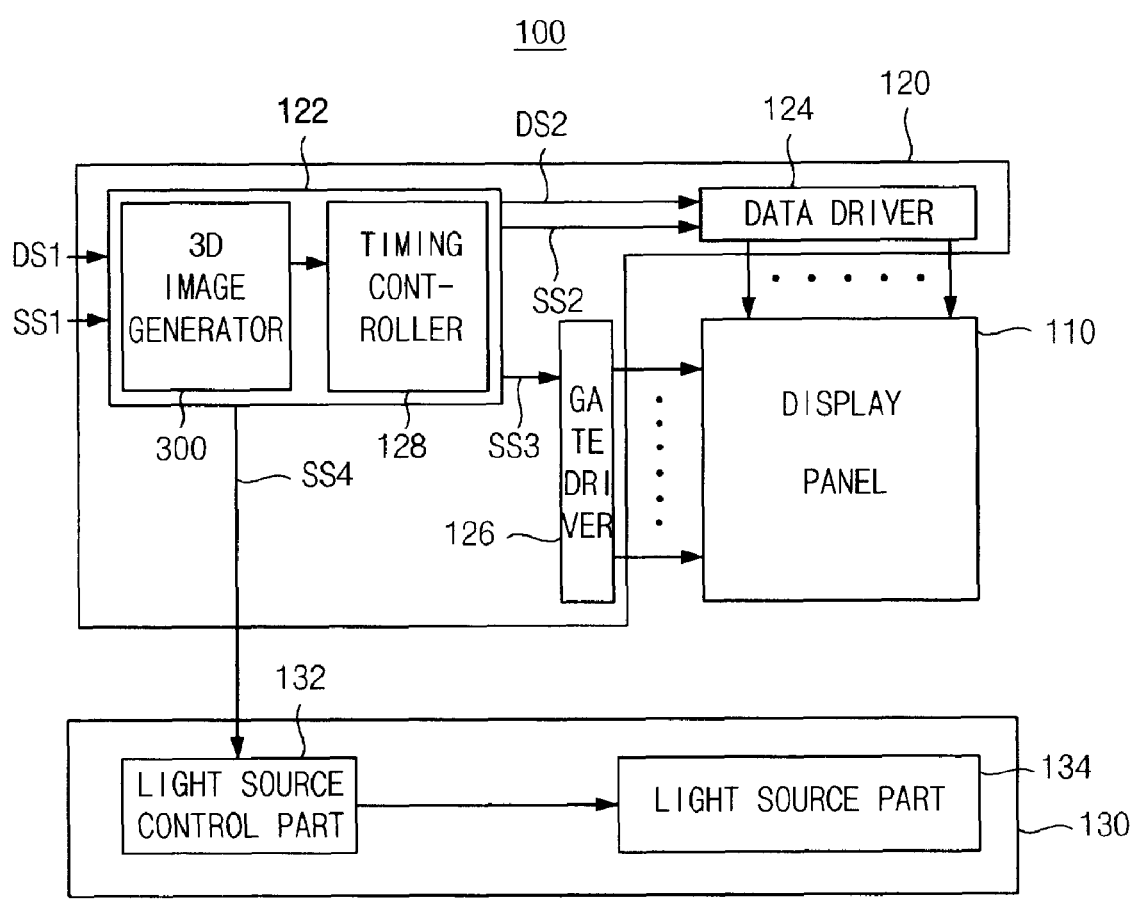
FIG. 1 is a block diagram showing a three-dimensional image display device in accordance with an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

FIG. 1 is a block diagram showing a three-dimensional image display device in accordance with an exemplary embodiment of the present invention.

Referring to FIG. 1, a three-dimensional image display device 100 includes a display panel 110 and a driving part 120. The three-dimensional image display device 100 displays a three-dimensional image according to a plurality of viewpoints. For example, the three-dimensional image display device 100 may have 9 viewpoints.

The display panel 110 includes an upper substrate, a lower substrate facing the upper substrate, and a liquid crystal layer between the upper substrate and lower substrate. The display panel 110 displays an image. The display panel 110 includes a plurality of pixels to display the image. Each pixel includes a switching element connected to a gate line and a data line, and a liquid crystal capacitor and a storage capacitor that are connected to the switching element.

The driving part 120 may include a controller 122, a data driver 124, and a gate driver 126.

The controller 122 receives a first control signal SS1 and a first image signal DS1 from the exterior. The first control signal SS1 may include a vertical synchronizing signal (Vsync), a horizontal synchronizing signal (Hsync), and a data enable signal (DE). The vertical synchronizing signal (Vsync) represents a required time for displaying one frame. The horizontal synchronizing signal (Hsync) represents a required time for displaying one line. Therefore, the horizontal synchronizing signal (Hsync) includes pulses corresponding to the number of pixels of one line. The data enable signal (DE) represents a required time provided to the pixels.

For example, the first image signal DS1 may include data for the three-dimensional image. That is, the first image signal DS1 may include two-dimensional image data and depth data of the two-dimensional image data.

The controller 122 may include a three-dimensional image generator 300 and a timing controller 128. The three-dimensional image generator 300 outputs three-dimensional image data by shifting the two-dimensional image data by the depth data of the two-dimensional image data. The timing controller 128 controls the output time of the three-dimensional image data.

The controller 122 converts the first image signal DS1 into a second image signal DS2, and provides the data driver 124 with the second image signal DS2. When the first image signal DS1 is a general image signal, the controller 122 may convert the first image signal DS1 into three-dimensional image signals and may provide the data driver 124 with the converted three-dimensional image signals as the second image signal DS2.

The controller 122 generates a second control signal SS2 and a third control signal SS3 that control a driving time of the display panel 110 using the first control signal SS1.

The data driver 124 generates data signals using the second control signal SS2 and the second image signal DS2, and provides data lines of the display panel 110 with the generated data signals. The second control signal SS2 may include a clock signal and a horizontal start signal (STH).

The gate driver 126 generates gate signals activating gate lines using the third control signal SS3 and provides the gate lines with the generated gate signals. The third control signal SS3 may include a vertical start signal (STV).

The three-dimensional image display device 100 may further include a backlight assembly 130. The backlight assembly 130 includes a light source control part 132 and a light source part 134.

The light source control part 132 provides the light source part 134 with power in response to a fourth control signal SS4 provided from the controller 122. The light source part 134 is disposed on a rear surface of the display panel 110 and provides the display panel 110 with light in response to the power provided from the light source control part 132.

FIG. 2 is an image showing an example of two-dimensional image data and depth data of the two-dimensional image data provided to the three-dimensional image display device of FIG. 1.

Figure 2A:
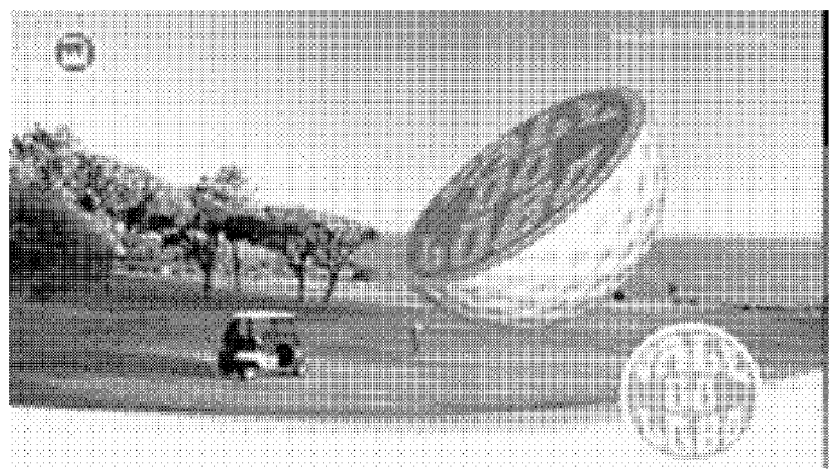
FIG. 2A is an example of two-dimensional image data provided to the three-dimensional image display device of FIG. 1.
Figure 2B:
FIG. 2B is an example of depth data of the two-dimensional image data of FIG. 2A.

FIG. 2A is an example of two-dimensional image data provided to the three-dimensional image display device of FIG. 1. FIG. 2B is an example of depth data of the two-dimensional image data of FIG. 2A.

Referring to FIG. 2A and FIG. 2B, a general two-dimensional image data and depth data of the two-dimensional image data are provided to the three-dimensional image display device 100, respectively. The three-dimensional image display device 100 displays a three-dimensional image by shifting the image data according to the depth data.

Figure 3:
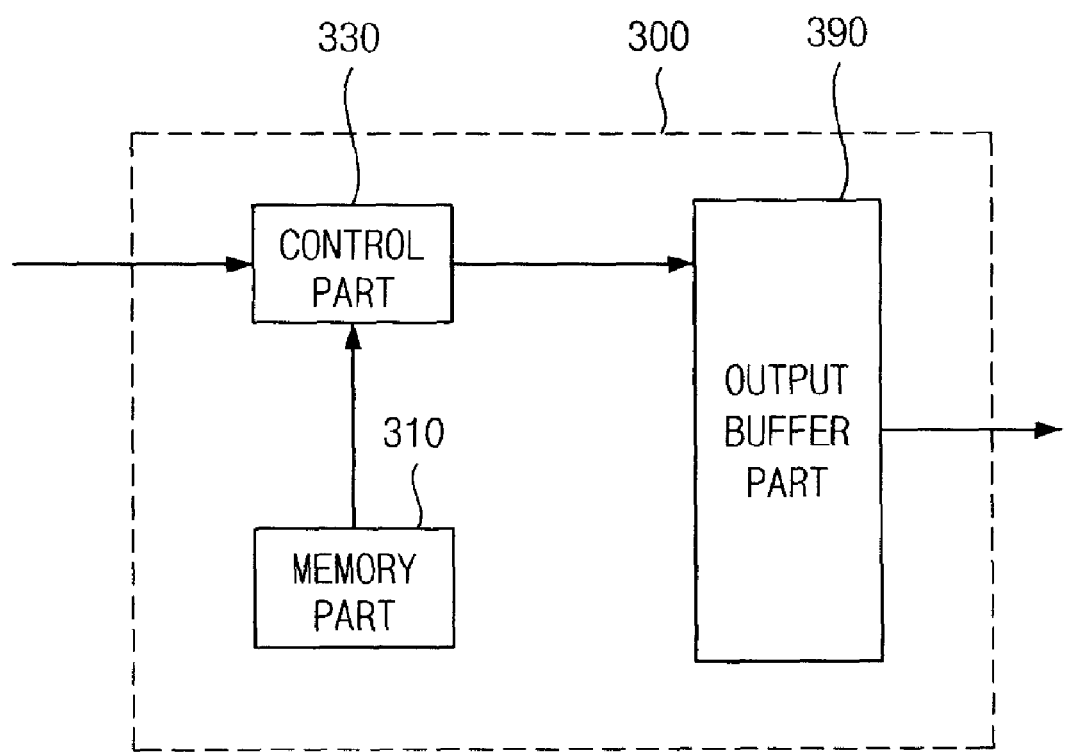
FIG. 3 is a block diagram showing the three-dimensional image generator of FIG. 1 in accordance with an exemplary embodiment of the present invention.

FIG. 3 is a block diagram showing the three-dimensional image generator of FIG. 1 in accordance with an exemplary embodiment of the present invention.

Referring to FIG. 3, the three-dimensional image generator 300 in accordance with an exemplary embodiment of the present invention includes a memory part 310, a control part 330 and an output buffer part 390. The memory part 310, the control part 330, and the output buffer part 390 may be integrally formed. That is, the three-dimensional image generator 300 may be formed on an integrated circuit (IC) chip.

The memory part 310 stores pixel-shift data in which shift distances of image are quantized according to each of viewpoints and depths. The quantized pixel-shift data is stored in a lookup table.

The control part 330 includes an internal memory (not shown). The control part 330 shifts the image data based on the depth data and the pixel-shift data corresponding to each viewpoint, when the image data and the depth data corresponding to each image line are provided from the exterior.

When the two-dimensional image data and the depth data of the two-dimensional image data are provided from the exterior, the control part 330 stores the image data and the depth data in the internal memory (not shown). The internal memory (not shown) may be classified as either a portion storing the image data or the other portion storing the depth data. The internal memory (not shown) may be a line memory.

The control part 330 stores the image data and the depth data, scans each line, and then the control part 330 shifts the image data by reading the pixel-shift data corresponding to the depth data.

The output buffer part 390 outputs the three-dimensional image data by appointing an address to the shifted image data.

The three-dimensional image generator 300 may include a low-pass filter (LPF) that low-pass filters the shifted image data.

The control part 330 may convert red, green and blue (RGB) image data provided from the exterior into YIQ image data and may store the YIQ image data in the internal memory (not shown). The control part 330 may be a field-programmable gate array (FPGA) and the internal memory (not shown) may be 12 line memories.

The control part 330 may resize the YIQ image data so that the YIQ image data is suitable for a three-dimensional image. When the three-dimensional image display device 100 has 9 viewpoints, for example, the YIQ image data of the display panel 110 may be controlled by dividing into 3×3 portions with a matrix shape. The control part 330 may resize the 3×3 portions to 4 pixel regions by combining the 4 adjacent portions with a rectangular shape. The center portions of the 3×3 portions are included in at least two pixel regions.

The Y (luminance) data of each pixel region uses average data of the Y data of the 4 adjacent portions, and IQ (chrominance) data uses original data.

When the control part 330 is the FPGA, the control part 330 may resize the YIQ image data using the internal memory (not shown) instead of a central processing unit (CPU) or an external memory. The internal memory (not shown) may separately store the resized YIQ image data and the depth data. For example, the internal memory (not shown) may be 12 line memories. The preceding line memories and the following line memories may alternately process data to increase processing efficiency.

The control part 330 may determine whether the image data provided from the exterior is image data for displaying a three-dimensional image or for displaying a two-dimensional image. When the image data is for displaying the three-dimensional image, a process for displaying the three-dimensional image is performed, for example, to shift the image data. When the image data is for displaying the two-dimensional image, a process for displaying the three-dimensional image is not performed.

Figure 4A:
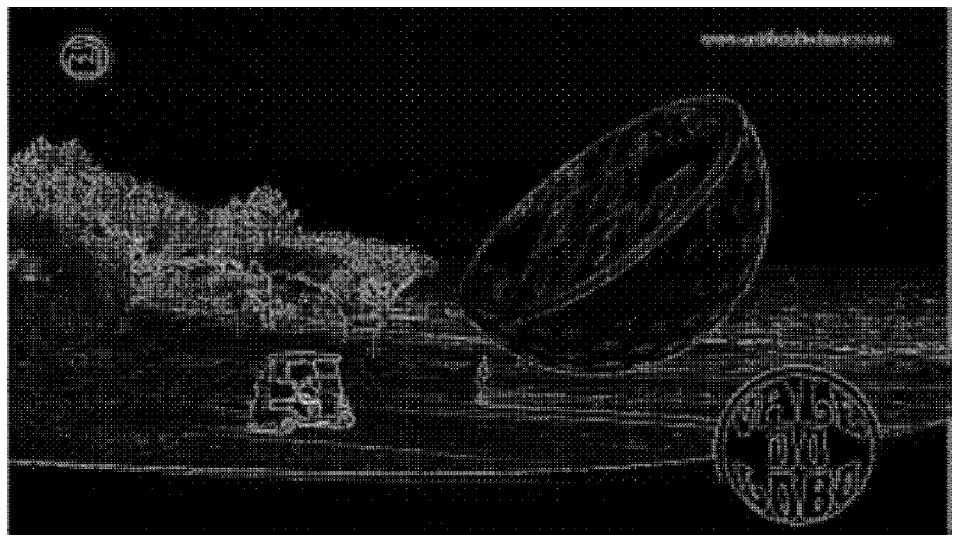
FIG. 4A shows an example of masking edges of image data using Laplacian filtering.
Figure 4B:
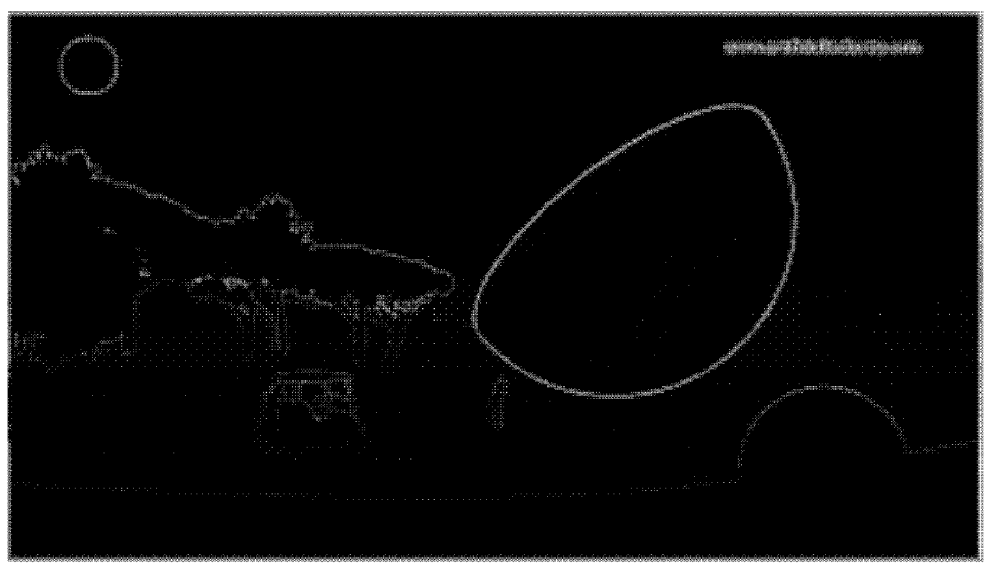
FIG. 4B shows an example of masking edges of depth data using Laplacian filtering.

FIG. 4A shows an example of masking edges of image data using Laplacian filtering. FIG. 4B shows an example of masking edges of depth data using Laplacian filtering.

Referring to FIG. 4A and FIG. 4B, the control part 330 may mask edges of an image by Laplacian-filtering the image data and the depth data stored in the internal memory (not shown), respectively. The control part 330 may determine whether the image data is image data for displaying the three-dimensional image by comparing the masked edges.

For example, the control part 330 may determine that the image data is for displaying the three-dimensional image, when the Laplacian-filtered depth data has edges corresponding to edges of the Laplacian-filtered image data. The control part 330 may count the number of data corresponding to the edges by scanning the Laplacian-filtered depth data and the Laplacian-filtered image data, respectively. The data corresponding to the edges of the Laplacian-filtered depth data and the Laplacian-filtered image data may be "1". The control part 330 may determine that the image data is for displaying the three-dimensional image, when the number of data (1) of the depth data is from about 60% to about 80% of the number of data (1) of the image data.

Figure 5:
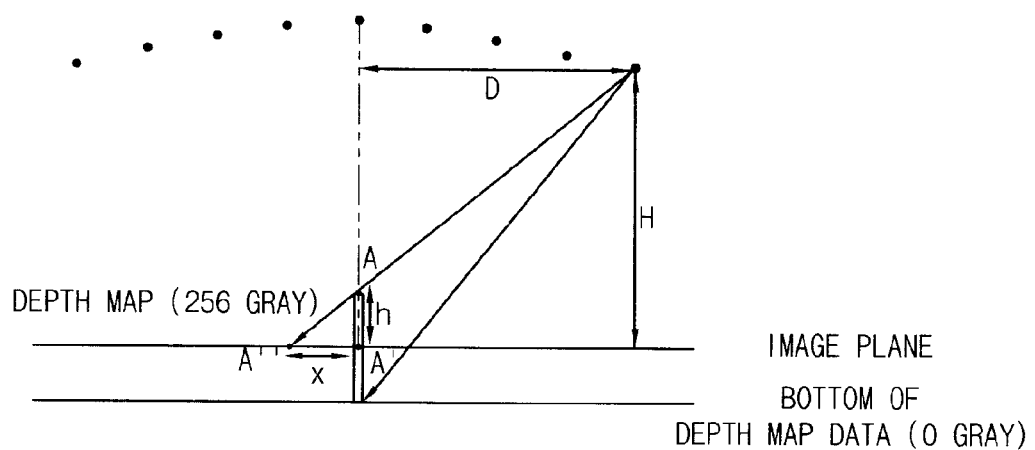
FIG. 5 is a conceptual view showing an example of shifting image data according to depth data.

FIG. 5 is a conceptual view showing an example of shifting image data according to depth data.

Referring to FIG. 5, the three-dimensional image display device 100 (shown in FIG. 1) may display a 9-viewpoint image. From a viewer's viewpoint, viewpoints may be defined as first, second, third, fourth, fifth, sixth, seventh, eighth, and ninth viewpoints from the right.

At a first viewpoint, an object at point A is displayed at point A' of an image display plane on a two-dimensional image. However, at a first viewpoint, the object has to shift from point A' to point A" so as to display the object as a three-dimensional image. The shift distances are different from each viewpoint so as to display the object as the three-dimensional image at the second to ninth viewpoints.

In an exemplary embodiment of the present invention, the shift distances of the image data according to each viewpoint and depths are calculated, and then the pixel-shift data forming the lookup table are stored in the interior of the three-dimensional image display device 100 (shown in FIG. 1). When the image data and the depth data are provided from the exterior, each of the shift distances of the image data corresponding to each viewpoint of the depth data is read. Then, the three-dimensional images are displayed by shifting each image data of each viewpoint.

The shift distances of the image data corresponding to each viewpoint and depth are calculated and stored. The quantizing of the pixel-shift data may be made so that the pixel-shift data is stored in the interior of the three-dimensional image display device 100 (shown in FIG. 1), which may be in an integrated circuit.

The depth data may be the data forming gray levels. In an exemplary embodiment of the present invention, an example of the data that are formed from 0 to 255 gray levels is explained. When the image display plane is a standard of the depth data having a 128 gray level, the depth data having the highest height may be a 255 gray level, and the depth data having the lowest height may be a 0 gray level.

Hereinafter, a method for calculating the pixel-shift data is explained with reference to FIG. 5.

The shift distance from point A' to point A" in the first viewpoint is defined as x. x has units in the International System of Units (SI). When the height of point A is defined as h, the height of SI units is defined as multiplying a gray level corresponding to the depth data of h by a setting height (SI units) corresponding to one gray level. For example, the setting height (SI units) corresponding to one gray level may be 3 mm. D represents a distance from a center viewpoint to the first viewpoint (that is, a present viewpoint) and H represents a distance from the first viewpoint (that is, the present view) point to the image display plane.

x that is the shift distance from point A' to point A" is defined as the following Equation 1.

$$x:z+D = h:H \quad \text{Equation 1}$$

The Equation 1 represents $x=(h*D)/(H-h)$. x is divided by a width of a pixel so as to change pixel units. When the width of the pixel is defined as q, the pixel units of x is defined as the following Equation 2.

$$\text{Pixel shift data} = (h*D)/\{q*(H-h)\} \quad \text{Equation 2}$$

In Equation 2, the pixel shift data represents the pixel units of x that is the shift distance from point A' to point A". When computer calculates the pixel shift data, the pixel shift data may be calculated accurately down to decimal places. In an exemplary embodiment of the present invention, the pixel-shift data may be rounded off in order to process the image shift data in real-time in the integrated circuit.

The pixel shift data according to each depth data of the first viewpoint is stored in the lookup table of the memory part 310. Also, the pixel shift data according to each of the depth data of the second to ninth viewpoints is stored in the lookup table of the memory part 310.

FIG. 6A to FIG. 6I are images showing examples of shifted images according to each viewpoint generated by the three-dimensional image generator of FIG. 3.

Figure 6:
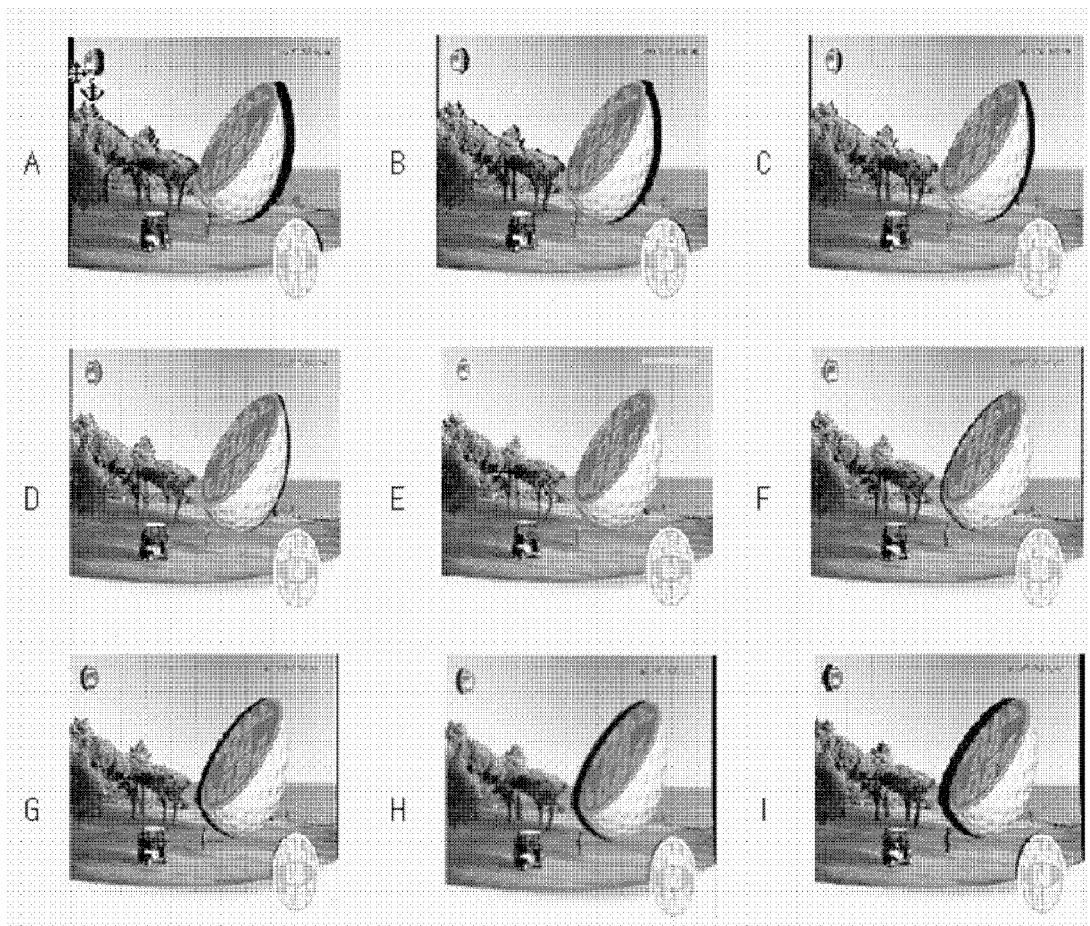
FIG. 6A to FIG. 6I show examples of shifted images according to a plurality of image viewpoints by the three-dimensional image generator of FIG. 3.

Referring to FIGS. 6A to. 6I, the shift distances are different from each viewpoint. Shadow images are shown in FIGS. 6A to 6D and FIGS. 6F to 6I by shifting the image data. The shadow images are created by generating blank pixels according to shifting the image data. The three-dimensional image generator 300 of FIG. 3 may further include a pixel compensating part in order to solve the shadow images.

Figure 7:
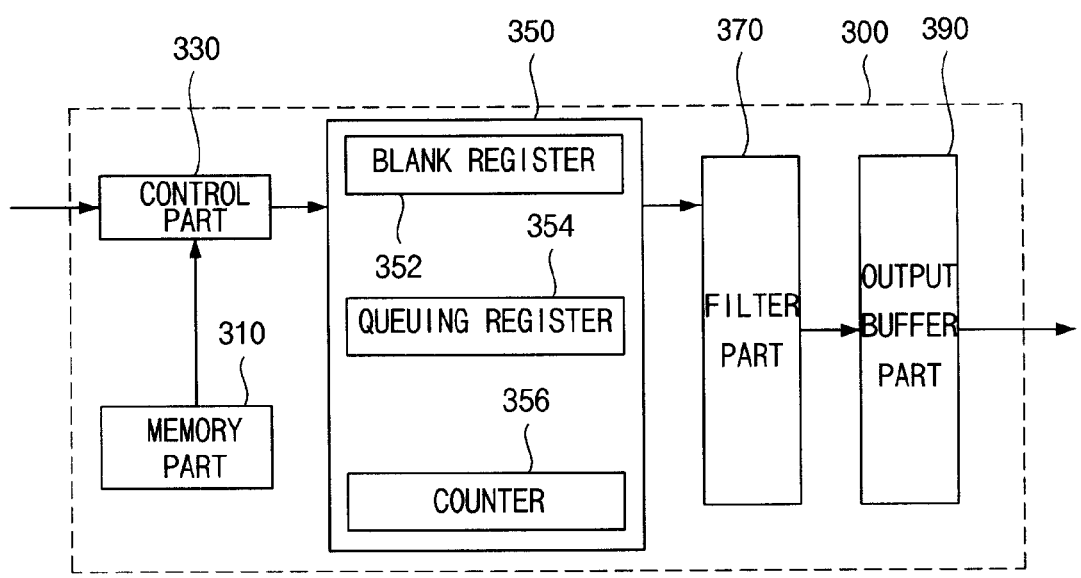
FIG. 7 is a block diagram showing the three-dimensional image generator of FIG. 1 in accordance with an exemplary embodiment of the present invention.

FIG. 7 is a block diagram showing the three-dimensional image generator of FIG. 1 in accordance with an exemplary embodiment of the present invention.

Referring to FIG. 7, the three-dimensional image generator 300 in accordance with an exemplary embodiment of the present invention may include a memory part 310, a control part 330, a pixel compensating part 350, a filter part 370, and an output buffer part 390. The memory part 310, the control part 330, the pixel compensating part 350, the filter part 370, and the output buffer part 390 may be integrally formed. That is, the three-dimensional image generator 300 may be formed on an integrated circuit chip.

The three-dimensional image generator 300 is substantially the same as that of FIG. 3 except the pixel compensating part 350 and the filter part 370, and thus substantially the same elements in FIG. 3 are referred to using the same reference numerals, and further description of the same elements will be omitted.

The pixel compensating part 350 includes a blank register 352, a queuing register 354, and a counter 356.

The blank register 352 stores shifted addresses of image data, after shifting the image data by the control part 330. The blank register 352 may be a temporary register.

The queuing register 354 stores depth data of the image data. The queuing register 354 merely stores depth data, and does not appoint the addresses. The queuing register 354 may be a queuing type that delays the foregoing data, whenever the depth data is provided in order.

The counter 356 counts the number of blank pixels generated from shifting the image data by reading the blank register 352. When the number of blank pixels is less than 3, the pixel compensating part 350 fills the blank pixels with an average value of the image data corresponding to pixels on both sides of the blank pixels. The compensating method assumes the same object exists on either side of the blank pixels, if a difference between the depth data of the pixel on either side of the blank pixels is respectively low. When the blank pixels are filled with any one image data corresponding to pixels on both sides of the blank pixels, a stepped image is generated in the same object. Thus, the average value of the image data corresponding to pixels on both sides of the blank pixels is provided so as to smoothly display the image.

When the number of blank pixels is greater than 3, the pixel compensating part 350 reads the queuing register 354 and compares the depth data corresponding to pixels on both sides of the blank pixels, and then fills the blank pixels with the image data corresponding to the one side pixel that has the lower depth data than the other side pixel. The compensating method assumes a border of the object, if the difference of the depth data is respectively high. The pixel having the lower depth data may generally be a background, so as to solve the shadow images by treating the blank pixels as the background.

The three-dimensional image generator 300 may further include the filter part 370. The filter part 370 may prevent deterioration of the image that may be generated from quantizing the pixel-shift data and shifting the image data. The filter part 370 low-pass filters the shifted image data and rearranges the shifted image data according to a structure of the pixel, before outputting the shifted image data to the output buffer part 390 so that the display quality may be enhanced. Because the low-pass filter is capable of filtering in one line on the integrated circuit, display quality may be more enhanced than that of the high-pass filter.

Figure 8A:
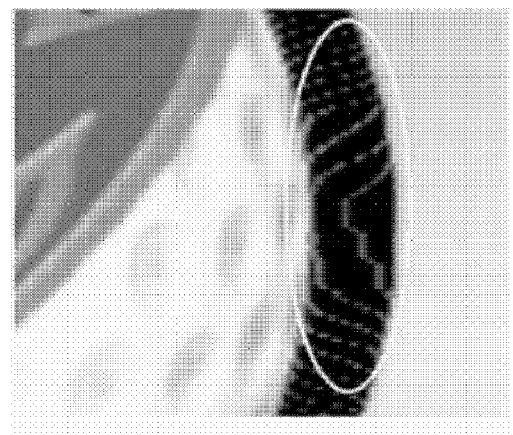
FIGS. 8A to 8C are images showing an image wave error.
Figure 8B:
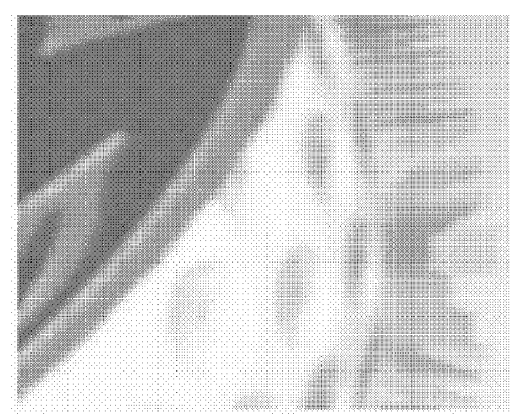
Figure 8C:
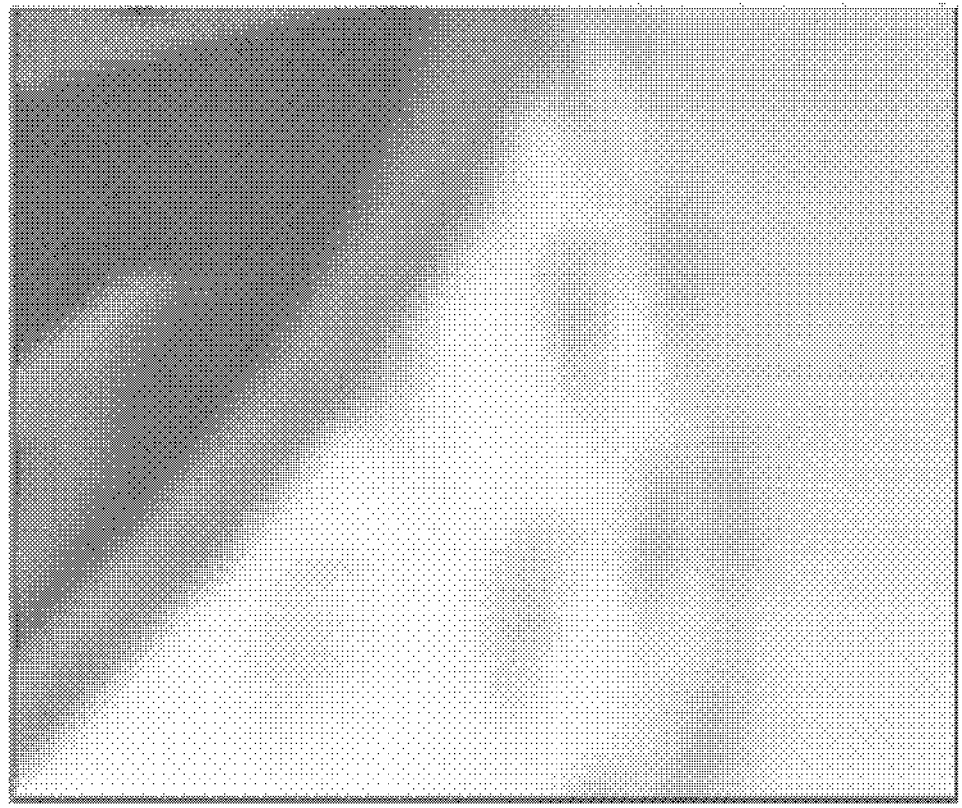

FIGS. 8A to 8C are images showing an image wave error. That is, FIG. 8A is an enlarged image showing image depth of a round object border portion. FIG. 8B is an image after shifting image data. FIG. 8C is an image after compensating blank pixels of FIG. 8B.

Referring to FIG. 8A, a pixel generally has a square shape, so that an edge portion of a round object is represented as an oblique line to smoothly display the round object. Thus, at blank pixels, the wave error is represented as shown in FIG. 8B, when the image data is shifted. In this condition, when blank pixels are compensated, an afterimage remains as shown in FIG. 8C.

The depth data stored in the internal memory (not shown) of the control part 330 of FIG. 7 may be calibrated for solving the wave error of the image.

Figure 9:
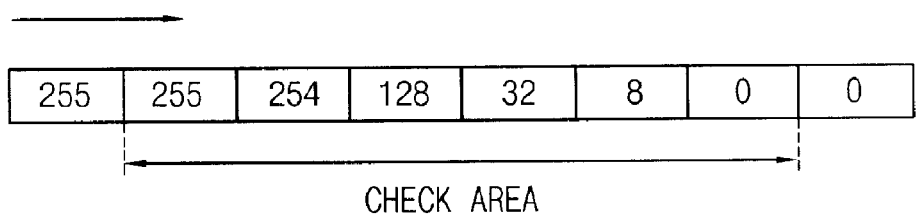
FIG. 9 is a conceptual view showing an example of a depth data scanning process in accordance with an exemplary embodiment of the present invention.
Figure 10A:
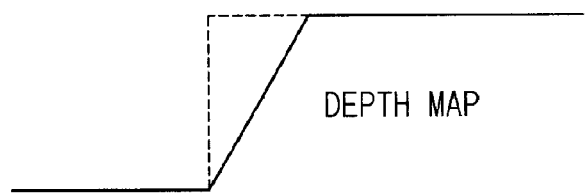
FIGS. 10A and 10B are images showing examples of calibrating depth data having an oblique line shape with a right angle shape.
Figure 10B:
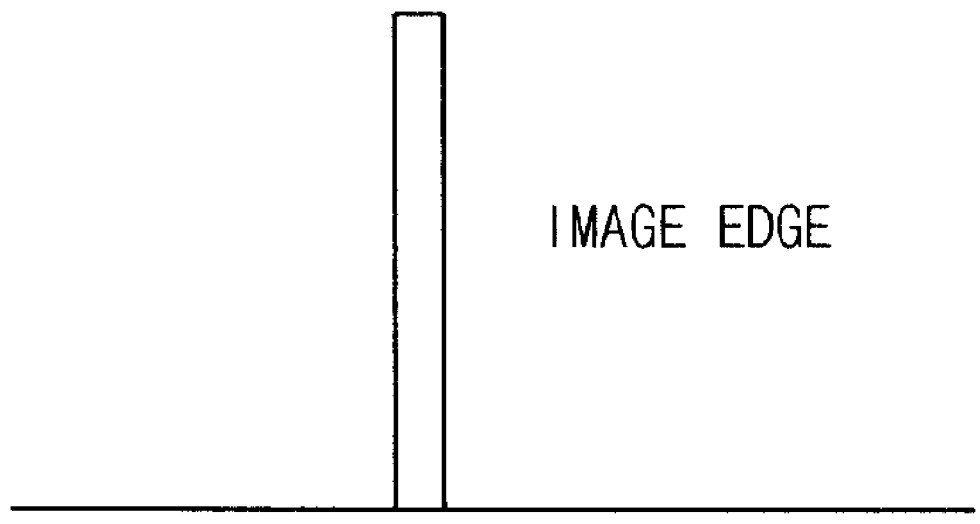
Figure 10B:
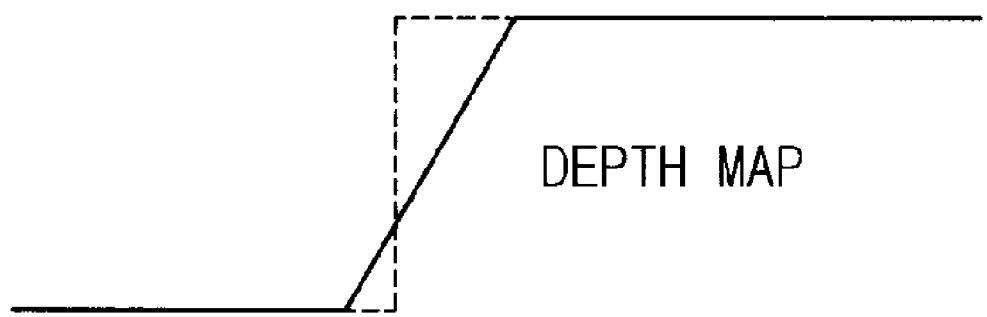
Figure 10C:
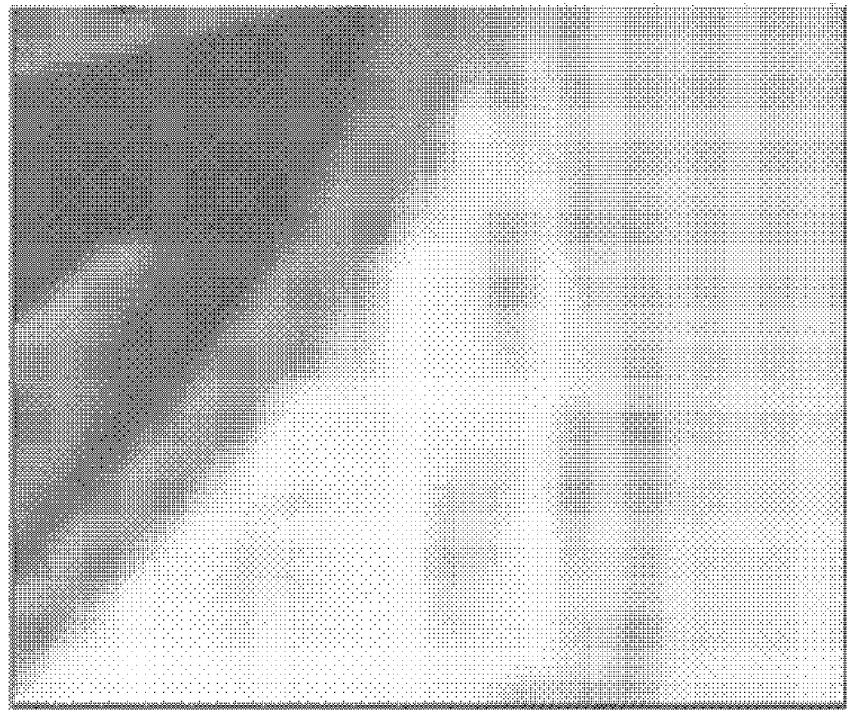
FIG. 10C is an image showing an example of calibrating stored depth data.

FIG. 9 is a conceptual view showing an example of a scanning process of depth data in accordance with an exemplary embodiment of the present invention. FIGS. 10A and 10B are images showing examples of calibrating depth data having an oblique line shape with a right angle shape. FIG. 10C is an image showing an example of calibrating stored depth data.

Referring to FIG. 9, the control part 330 (shown in FIG. 7) stores the image data and the depth data provided to the internal memory (not shown) in each line. The control part 330 scans each line of the depth data stored in the internal memory (not shown) and calibrates the depth data.

Referring to FIG. 10A, as an exemplary embodiment of calibrating depth data, the control part 330 compares a difference of the depth data corresponding to both sides of a predetermined area in each line. When the difference value of depth data is greater than a predetermined value, the predetermined area is determined to be at an object edge. The predetermined area determined to be at the object edge is calibrated with the depth data corresponding to the one side that has the higher depth data than the other side, and is stored.

Referring to FIG. 9, for example, a check area is defined as six areas, and then the lines of the depth data are scanned. When the predetermined value that is determined to be at an edge is 150, the gray levels of the both sides of the check area are 0 and 255 so that the gray level difference is greater than the predetermined value (that is, 150). Thus, the check area is determined to be on the edge portion, and is calibrated with the higher gray level, that is, gray level 255. Using the same method, the depth data of every line stored in the internal memory (not shown) of the control part 330 is calibrated.

Referring to FIG. 10B, as another exemplary embodiment of calibrating depth data, the control part 330 converts RGB image data provided from the exterior into YIQ image data, and scans the Y (luminance) data. The conversion of RGB image data into YIQ image data may use National Television System Committee (NTSC) coefficients. For example, the conversion may be defined the following Equation 3.

$$Y \text{ data} = 0.5G + 0.25R + 0.25B \quad \text{Equation 3}$$

When a difference value of Y data corresponding to pixels on both sides of each pixel is greater than a first predetermined value (for example, 5) by scanning Y data of the YIQ image data, the control part 330 may determine the pixel as an edge of an image. Then, when a difference value of depth data is greater than a second predetermined value by comparing the depth data corresponding to both sides of a predetermined area by scanning each line of the depth data stored in internal memory, the control part 330 may calibrate the depth data corresponding to the preceding pixels of the pixel determined as the edge with the depth data corresponding to the one side that has the lower depth data than the other side, and may calibrate the depth data corresponding to the following pixels of the pixel determined as the edge with the depth data corresponding to the one side that has the greater depth data than the other side.

The deterioration of the image displayed that is generated by calibrating the depth data and rounding off the pixel-shift data may be decreased by low-pass filtering, before outputting to the output buffer 390.

Comparing FIG. 10C with FIG. 8C in which the image is not calibrated, the wave error is decreased.

Figure 11:
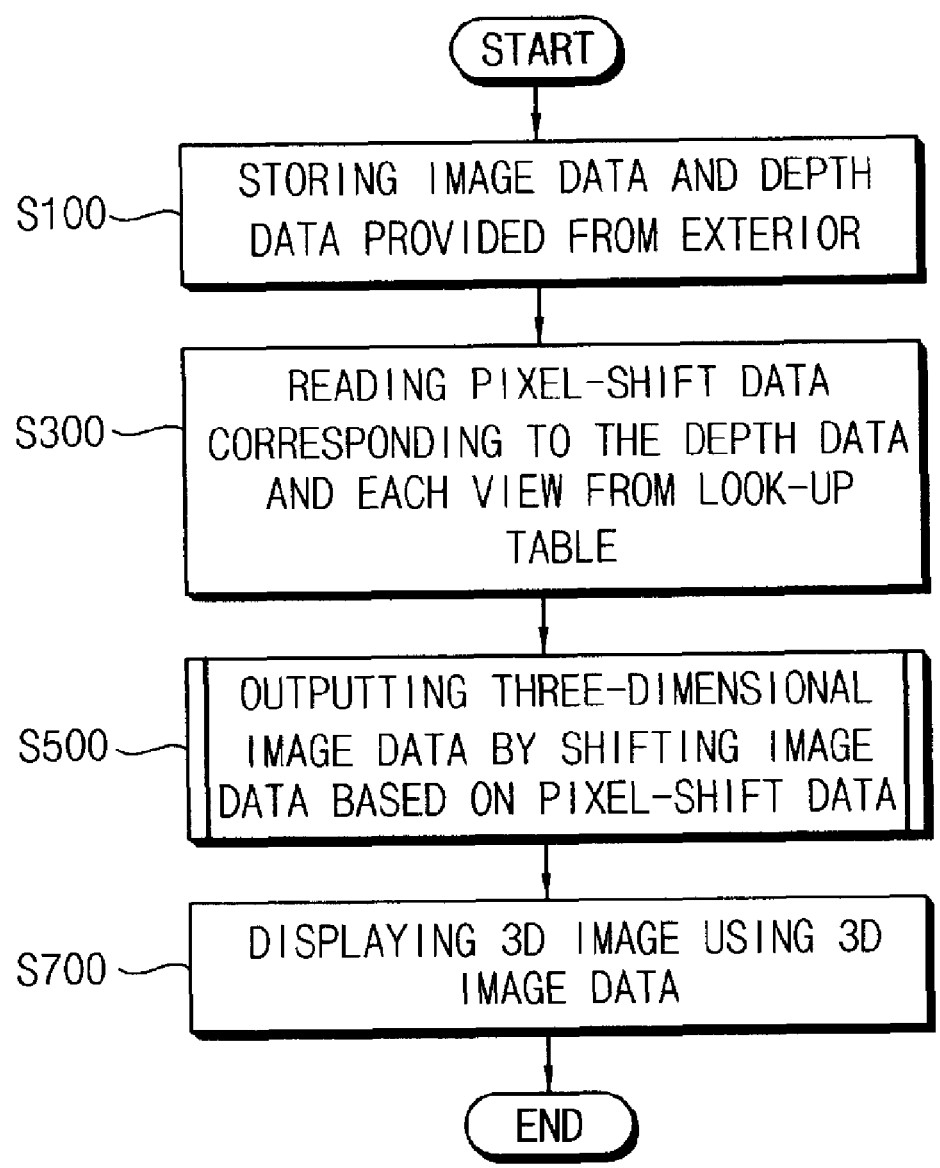
FIG. 11 is a flowchart showing a method for displaying a three-dimensional image in accordance with an exemplary embodiment of the present invention.

FIG. 11 is a flowchart showing a method for displaying a three-dimensional image in accordance with an exemplary embodiment of the present invention.

Referring to FIG. 7 and FIG. 11, image data and depth data of the image data provided from the exterior are stored in the internal memory (not shown) of the control part 330 (step S100).

Pixel-shift data corresponding to the depth data and each of viewpoints from a lookup table that stores the pixel-shift data according to each of the viewpoints and depths is read (step S300). The pixel-shift data stored in the lookup table may be calculated by Equation 1 and Equation 2. Also, the pixel-shift data may be rounded off in order to process the pixel-shift data in real-time in the integrated circuit (IC).

Three-dimensional image data is outputted by shifting the image data based on the pixel-shift data (step S500).

The outputted three-dimensional image data is provided to the display panel and a three-dimensional image is displayed (step S700).

According to an exemplary embodiment of the present invention, step S500 may further include a step where blank pixels are compensated after shifting the image data. The blank pixels are generated by shifting the image data.

FIG. 12 is a flowchart showing a method for compensating blank pixels generated by shifting the image data in accordance with an exemplary embodiment of the present invention.

Referring to FIG. 7 and FIG. 12, after shifting the image data, an address of the shifted image data is stored in a blank register 352 (step S510) and the depth data of the shifted image data is stored in a queuing register 354 (step S520).

The number of the blank pixels generated from shifting the image data is counted by reading the blank register 252 (step S530).

At step S540, when the number of the blank pixels is greater than 3, the depth data stored in the queuing register 354 is read and the depth data corresponding to pixels on both sides of the blank pixels is compared with each other (step S550).

At step S550, the blank pixels are compensated with the image data corresponding to the one side pixel that has the lower depth data than the other side pixel (step S560). For example, the blank pixels are filled with the image data corresponding to the side pixel that has the lower depth data than the other side pixel.

At step S540, when the number of the blank pixels is less than 3, the blank pixels are compensated with an average value of the image data corresponding to pixels on both sides of the blank pixels (step S570). For example, the blank pixels are filled with the average value of the image data corresponding to pixels on both sides of the blank pixels.

A method for displaying a three-dimensional image and a three-dimensional image display device according to exemplary embodiments of the present invention may display a three-dimensional image of good quality by merely driving the three-dimensional image display device, because the quantized shift distances of the image data according to each viewpoint and depth are stored in the interior of the three-dimensional image display device.

As described above, a three-dimensional image display device according to exemplary embodiments of the present invention may be applied to a liquid crystal display (LCD) device as well as a portable display device, a plasma display panel (PDP) device, a three-dimensional game player, a three-dimensional television (TV), and so on.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method that uses a display device to display a three-dimensional image, the method comprising:
   storing image data and depth data of the image data;
   reading pixel-shift data corresponding to the depth data and a plurality of viewpoints from a lookup table;
   outputting three-dimensional image data by shifting the image data based on the pixel-shift data; and
   displaying, using the display device, a three-dimensional image using the three-dimensional image data.

2. The method of claim 1, wherein the pixel-shift data is calculated by the following equation:

$$(h \times D)/\{q \times (H-h)\}$$

wherein h represents multiplying a gray level corresponding to the depth data by a setting height corresponding to one gray level, D represents a distance from a center viewpoint to a present viewpoint, q represents a pixel width, and H represents a distance from the present viewpoint to an image display plane.

3. The method of claim 2, wherein the pixel-shift data is rounded off and stored in the lookup table.

4. The method of claim 1, further comprising compensating blank pixels generated from shifting the image data.

5. The method of claim 4, wherein compensating the blank pixels comprises:
   storing an address of the shifted image data in a blank register;
   storing the depth data of the shifted image data in a queuing register;
   counting the number of blank pixels generated from shifting the image data by reading the blank register; and
   filling the blank pixels with image data corresponding to pixels on both sides of the blank pixels.

6. The method of claim 5, wherein filling the blank pixels comprises:
   filling the blank pixels with an average value of the image data corresponding to pixels on both sides of the blank pixels, when the number of the blank pixels is less than 3.

7. The method of claim 5, wherein filling the blank pixels comprises:
   comparing the depth data corresponding to pixels on both sides of the blank pixels by reading the queuing register, when the number of the blank pixels is greater than 3; and
   filling the blank pixels with the image data corresponding to the one side pixel that has lower depth data than the other side pixel.

8. The method of claim 1, further comprising calibrating the depth data stored in an internal memory.

9. The method of claim 8, wherein calibrating the depth data comprises:
   comparing the depth data corresponding to both sides of a predetermined area by scanning each line of the depth data stored in the internal memory; and
   calibrating the predetermined area with the depth data corresponding to the one side that has the higher depth data than the other side, when a difference value of depth data is greater than a predetermined value.

10. The method of claim 1, wherein outputting three-dimensional image data further comprises low-pass filtering the shifted image data.

11. The method of claim 1, further comprising converting red, green and blue (RGB) image data provided from the exterior into YIQ image data.

12. The method of claim 11, further comprising resizing the YIQ image data.

13. The method of claim 12, wherein resizing the YIQ image data comprises:
   dividing the YIQ image data into 3×3 portions;
   resizing the 3×3 portions to 4 pixel regions by combining the 4 adjacent portions; and
   outputting Y (luminance) data of each pixel region by calculating average data of the Y data of the 4 adjacent portions.

14. The method of claim 11, further comprising calibrating the depth data stored in an internal memory.

15. The method of claim 14, wherein calibrating the depth data comprises:
   determining a pixel as an edge of an image, when a difference value of Y data corresponding to pixels on both sides of each pixel is greater than a first predetermined value by scanning each line of the YIQ image data stored in the internal memory;
   comparing the depth data corresponding to both sides of a predetermined area by scanning each line of the depth data stored in the internal memory; and
   calibrating the depth data corresponding to the preceding pixels of the pixel determined as the edge with the depth data corresponding to the one side that has the lower depth data than the other side and calibrating the depth data corresponding to the following pixels of the pixel determined as the edge with the depth data corresponding to the one side that has the greater depth data than the other side, when a difference value of depth data is greater than a second predetermined value.

16. The method of claim 1, further comprising determining whether the image data provided from the exterior is image data for displaying the three-dimensional image.

17. The method of claim 16, wherein determining whether the image data provided from the exterior is the image data for displaying the three-dimensional image comprises:

masking edges of an image by Laplacian-filtering the image data and the depth data, respectively; and determining whether the image data is the image data for displaying the three-dimensional image by matching the image data and the depth data that are Laplacian-filtered.

18. The method of claim 17, wherein determining whether the image data is the image data for displaying the three-dimensional image by matching the image data and the depth data that are Laplacian-filtered comprises:

counting the number of data corresponding to the edges by scanning the depth data that is Laplacian-filtered;

counting the number of data corresponding to the edges by scanning the image data that is Laplacian-filtered; and determining the image data as the image data for displaying the three-dimensional image, when the number of data corresponding to the edges of the depth data is from about 60% to about 80% of the number of data corresponding to the edges of the image data.

19. A three-dimensional image display device, comprising:

a three-dimensional image generator comprising a memory part having a lookup table to store pixel-shift data corresponding to a plurality of viewpoints and depths, a control part to store image data and depth data in an internal memory, and to output shifted image data based on the pixel-shift data, and an output buffer part to output three-dimensional image data based on the shifted image data; and a display panel to display the three-dimensional image data.

20. The device of claim 19, wherein the three-dimensional image generator further comprises a filter part that low-pass filters the shifted image data.

21. The device of claim 20, wherein the memory part, the control part, the filter part, and the output buffer part are integrally formed.

22. The device of claim 19, wherein a standard of the depth data has a 128 gray level, when the depth data has from a 0 gray level to a 255 gray level.

23. The device of claim 19, wherein the pixel-shift data is calculated by the following equation:

(h×D)/{q×(H−h)} wherein h represents multiplying a gray level corresponding to the depth data by a setting height corresponding to one gray level, D represents a distance from a center viewpoint to a present viewpoint, q represents a pixel width, and H represents a distance from the present viewpoint to an image display plane.

24. The device of claim 23, wherein the pixel-shift data is rounded off and is stored in the lookup table.

25. The device of claim 19, wherein the three-dimensional image generator further comprises a pixel compensating part to compensate blank pixels generated from shifting the image data.

26. The device of claim 25, wherein the pixel compensating part comprises:

a blank register to store an address of the shifted image data;

a queuing register to store the depth data of the shifted image data; and a counter to count the number of blank pixels generated from shifting the image data by reading the blank register.

27. The device of claim 26, wherein the pixel compensating part outputs an average value of the image data corresponding to pixels on both sides of the blank pixels, when the number of the blank pixels is less than 3, and wherein the pixel compensating part outputs the image data corresponding to the one side pixel that has the lower depth data than the other side pixel by reading the queuing register and by comparing the depth data corresponding to pixels on both sides of the blank pixels, when the number of the blank pixels is greater than 3.

28. The device of claim 19, wherein the control part calibrates a predetermined area of the depth data corresponding to a pixel that has the higher depth data than another pixel, wherein each pixel is disposed on opposite sides of a predetermined area, by scanning each line of the depth data stored in the internal memory, and by comparing the depth data corresponding to the pixels on opposite sides of the predetermined area, when the difference between values of depth data is greater than a predetermined value.

29. The device of claim 19, wherein the control part converts RGB image data provided from the exterior into YIQ image data and stores the YIQ image data in the internal memory.

30. The device of claim 29, wherein the control part is a field-programmable gate array (FPGA).

31. The device of claim 30, wherein the FPGA resizes the YIQ image data divided into 3×3 portions to 4 pixel regions by combining the 4 adjacent portions.

32. The device of claim 31, wherein the FPGA outputs Y (luminance) data of each pixel region by calculating average data of the Y data of the 4 adjacent portions.

33. The device of claim 32, wherein the resized YIQ image data and the depth data are separately stored in the internal memory.

34. The device of claim 33, wherein the internal memory is 12 line memories, and the preceding line memories and the following line memories alternately process data.

35. The device of claim 29, wherein the control part determines edges of an image by scanning the Y data stored in the internal memory, calibrates the depth data corresponding to the preceding pixels of the pixel determined as the edges with the depth data corresponding to the one side that has the lower depth data than the other side of a predetermined area, and calibrates the depth data corresponding to the following pixels of the pixel determined as the edges with the depth data corresponding to the one side that has the greater depth data than the other side of the predetermined area.

36. The device of claim 19, wherein the control part determines whether the image data is image data for displaying the three-dimensional image by Laplacian-filtering the image data and the depth data, respectively, and by matching the number of data corresponding to the edges of the depth data with the number of data corresponding to the edges of the image data.

* * * * *